United States Patent
Thelwell

(10) Patent No.: US 8,267,262 B2
(45) Date of Patent: Sep. 18, 2012

(54) PALLET RACK IMPACT PROTECTOR

(75) Inventor: Gordon Thelwell, Penistone (GB)

(73) Assignee: Rack Armour Limited, Barnsley (GB)

( * ) Notice: Subject to any disclaimer, the term of this patent is extended or adjusted under 35 U.S.C. 154(b) by 0 days.

(21) Appl. No.: 10/587,779

(22) PCT Filed: Apr. 18, 2005

(86) PCT No.: PCT/GB2005/001493
§ 371 (c)(1),
(2), (4) Date: Jul. 28, 2006

(87) PCT Pub. No.: WO2005/103389
PCT Pub. Date: Nov. 3, 2005

(65) Prior Publication Data
US 2007/0170137 A1 Jul. 26, 2007

(30) Foreign Application Priority Data

Apr. 20, 2004 (GB) ................................. 0408722.7
Jan. 10, 2005 (GB) ................................. 0500388.4

(51) Int. Cl.
*E04C 3/30* (2006.01)
(52) U.S. Cl. ............... 211/183; 211/191; 248/345.1; 5/663; 52/835
(58) Field of Classification Search ............... 211/183, 211/189, 191; 52/244, 287.1, 211, 716.8, 52/717.03, 835; D25/38; 428/36.9, 36.91; 108/27, 180, 186, 187, 190; 312/140.3, 140.4; 248/345, 345.1; 5/663, 946; 256/13.1; 404/6, 404/8; 405/211, 212, 214, 215, 216
See application file for complete search history.

(56) References Cited

U.S. PATENT DOCUMENTS

| | | | | |
|---|---|---|---|---|
| 1,398,925 A | * | 11/1921 | Tyler | 248/345.1 |
| 1,620,933 A | * | 3/1927 | Wilcox | 52/717.01 |
| 2,166,798 A | * | 7/1939 | Cote | 264/248 |
| 2,564,386 A | * | 8/1951 | Webb | 5/93.1 |
| 2,728,957 A | * | 1/1956 | Keller | 52/287.1 |
| 2,742,675 A | * | 4/1956 | Robertson | 52/126.7 |
| 2,807,312 A | * | 9/1957 | Florian | 108/27 |
| 2,926,361 A | * | 3/1960 | Hornik | 4/637 |
| 3,233,644 A | * | 2/1966 | Bono | 220/9.1 |
| 3,372,552 A | * | 3/1968 | Liddell | 405/215 |

(Continued)

FOREIGN PATENT DOCUMENTS

CA 2279436 1/2001

(Continued)

OTHER PUBLICATIONS

Hilo (Rack Sentry/Colum Sentry product—brochure).

*Primary Examiner* — Darnell Jayne
*Assistant Examiner* — Joshuha Rodden
(74) *Attorney, Agent, or Firm* — Harness, Dickey & Pierce, P.L.C.

(57) ABSTRACT

A pallet rack upright column protection device for the use in preventing and reducing destructive levels of kinetic energy of motion from occurring to a pallet rack upright. The device is made from an assembly of multilateral polymer based elastomeric materials that has a primary external component, and with a synergistic less dense internal component. The device attaches directly to the front and lateral sides of the lower section of a rack upright.

18 Claims, 12 Drawing Sheets

U.S. PATENT DOCUMENTS

| | | | | |
|---|---|---|---|---|
| 3,472,489 | A * | 10/1969 | Jack | 256/22 |
| 3,591,144 | A * | 7/1971 | Iving | 404/6 |
| 3,634,925 | A * | 1/1972 | Van Loo | 29/458 |
| 3,869,106 | A * | 3/1975 | Gregov | 248/345.1 |
| 3,934,385 | A * | 1/1976 | Paulus et al. | 52/716.5 |
| 4,019,301 | A * | 4/1977 | Fox | 52/834 |
| 4,088,229 | A * | 5/1978 | Jacoby et al. | 211/191 |
| 4,089,497 | A * | 5/1978 | Miller et al. | 248/345.1 |
| 4,109,887 | A * | 8/1978 | Wakeland, Jr. | 5/678 |
| 4,113,110 | A * | 9/1978 | Mittag | 211/191 |
| 4,153,230 | A * | 5/1979 | Giacin | 248/345.1 |
| 4,192,506 | A * | 3/1980 | Sofia | 473/548 |
| 4,214,326 | A * | 7/1980 | Spann | 5/632 |
| 4,244,156 | A * | 1/1981 | Watts, Jr. | 52/746.1 |
| 4,554,039 | A * | 11/1985 | James | 156/213 |
| 4,582,739 | A * | 4/1986 | Givens | 428/83 |
| RE32,406 | E * | 4/1987 | Molari, Jr. | 428/412 |
| 4,703,531 | A * | 11/1987 | Bissett | 5/663 |
| 4,710,992 | A * | 12/1987 | Falwell et al. | 5/663 |
| 4,768,320 | A * | 9/1988 | Weller | 52/211 |
| 4,883,281 | A * | 11/1989 | Waterman | 280/33.992 |
| 5,271,662 | A * | 12/1993 | Saul | 297/219.1 |
| 5,369,925 | A * | 12/1994 | Vargo | 52/244 |
| 5,370,249 | A * | 12/1994 | Harvey et al. | 211/189 |
| 5,482,238 | A * | 1/1996 | Kreiter | 248/222.12 |
| 5,496,609 | A * | 3/1996 | Michelstein | 428/71 |
| 5,605,414 | A * | 2/1997 | Fuller et al. | 40/607.11 |
| D380,274 | S * | 6/1997 | Stamets | D25/38 |
| 5,639,072 | A * | 6/1997 | McCall | 267/139 |
| 5,746,622 | A * | 5/1998 | Consoli et al. | 439/521 |
| 5,813,638 | A * | 9/1998 | Morris | 248/152 |
| D411,739 | S * | 6/1999 | Havens | D8/403 |
| 6,019,336 | A * | 2/2000 | Havens | 248/345.1 |
| 6,044,601 | A * | 4/2000 | Chmela et al. | 52/287.1 |
| 6,102,611 | A * | 8/2000 | Roller | 404/6 |
| 6,176,062 | B1 * | 1/2001 | Fayle | 52/835 |
| D437,723 | S * | 2/2001 | Lees | D6/610 |
| 6,242,070 | B1 * | 6/2001 | Gillispie et al. | 428/99 |
| 6,332,549 | B1 * | 12/2001 | MacDonald | 211/183 |
| 6,354,049 | B1 * | 3/2002 | Bennett | 52/287.1 |
| 6,357,187 | B1 * | 3/2002 | Haldeman | 52/211 |
| 6,378,831 | B1 * | 4/2002 | Copeland, Jr. | 248/345.1 |
| 6,405,884 | B1 * | 6/2002 | Dion | 211/189 |
| 6,526,708 | B1 * | 3/2003 | Hartley et al. | 52/211 |
| 6,609,620 | B1 * | 8/2003 | Kautz et al. | 211/183 |
| 6,619,490 | B2 * | 9/2003 | Calleja | 211/183 |
| D482,128 | S * | 11/2003 | Krueger et al. | D25/38 |
| 6,672,017 | B2 * | 1/2004 | Larson | 52/170 |
| 6,684,572 | B2 * | 2/2004 | Homolka et al. | 49/462 |
| 6,703,102 | B1 * | 3/2004 | Prescott | 428/76 |
| 6,920,990 | B2 * | 7/2005 | Krueger et al. | 211/183 |
| 7,090,428 | B2 * | 8/2006 | Hinojosa | 404/6 |
| 7,104,514 | B2 * | 9/2006 | Ciarlo | 248/345.1 |
| 7,104,525 | B2 * | 9/2006 | Ricci | 256/65.14 |
| 7,182,993 | B1 * | 2/2007 | Hamilton | 428/100 |
| D538,494 | S * | 3/2007 | Varga | D32/42 |
| D560,819 | S * | 1/2008 | Thelwell | D25/38 |
| 7,386,928 | B1 * | 6/2008 | Crorey | 29/453 |
| 2001/0047975 | A1 * | 12/2001 | Lazas et al. | 211/183 |
| 2001/0049909 | A1 * | 12/2001 | Homolka et al. | 49/460 |
| 2002/0150710 | A1 * | 10/2002 | Russo | 428/36.5 |
| 2004/0088933 | A1 * | 5/2004 | Mayes | 52/211 |
| 2004/0094496 | A1 * | 5/2004 | MacDonald | 211/189 |
| 2004/0149671 | A1 * | 8/2004 | Krueger et al. | 211/183 |
| 2004/0155003 | A1 * | 8/2004 | Anderson et al. | 211/191 |
| 2004/0234333 | A1 * | 11/2004 | Hinojosa | 404/6 |
| 2008/0029676 | A1 * | 2/2008 | Huxtable et al. | 248/345.1 |

FOREIGN PATENT DOCUMENTS

| | | |
|---|---|---|
| DE | 36 12 739 A1 | 12/1986 |
| DE | 40 02 957 A1 | 8/1991 |
| EP | 0 571 082 A1 | 11/1993 |
| EP | 1 295 993 A1 | 3/2003 |
| FR | 2 779 162 A1 | 12/1999 |
| GB | 1564195 A | 4/1980 |
| GB | 2 209 041 A | 4/1989 |
| GB | 2321688 B | 3/2001 |

* cited by examiner

PALLET RACK IMPACT PROTECTOR

FIELD OF THE INVENTION

The present invention relates to an impact protection device for a racking installation.

BACKGROUND OF THE INVENTION

The logistics of bulk storage and transport of goods and materials require an effective and efficient use of storage space. Known pallet racking offers the ability to store items using ever increasing capacities of vertical space up to the height and depth of the racks own dimensions. Adjustable pallet racking (APR) is the most common type of pallet racking system in use throughout the world. APR is a skeletal system of vertical, diagonal and horizontal interconnecting steel members. APR installations are usually constructed with a one pallet deep run of racking on either side of an operating aisle. If the racks can only be accessed from one side only by Mechanical handling equipment (MHE) then this is called a single entry run. If the racks can be accessed from both sides then this is called a double entry run.

Referring to FIG. 1 herein, known racking 100 consists usually of two major components, upright frames and beams. Upright frames 101 are assembled using pairs of continuously perforated uprights 102,103 connected by bracing members 104,105 with bolted, riveted or welded joints.

Upright frames are interconnected by beams 106,107 in pairs to form a row of bays as shown in FIG. 2 herein. Pairs of beams 200,201 are spaced apart vertically in each bay at a number of levels to provide locations for the pallet or unit loads. Each pair of beams at each level can carry one, two or more unit loads depending on its length and strength. The strength, stiffness and stability of the racking is provided by the upright frames and their connections 202 to the concrete floor slab, both of which must be maintained within the manufacturer's operating parameters in order to be safe.

In general, pallet racking is arranged to maximize the usage of available storage space, which means that the aisle spacing between adjacent runs of pallet racking is kept to a minimum consistent with achieving access to the racking for loading or unloading of the racking. By the very nature of its designed task, a mechanical handling equipment (MHE), such as a fork lift truck, must operate and maneuver within very close proximity to pallet racking equipment in order to transit, store and retrieve unit loads between and within the racks structure respectively. During these operations, there is a likelihood destructive dynamic impact forces between the moving MHE and the pallet racking may occur.

Damaged racking uprights have specific tolerances within which they must operate in order for them to be used safely. The upright and bracing sections of a racking frame are designed for bearing a vertical load. Lateral impacts can have severe safety and financial loss potential. The recommendations given in the Storage Equipment Manufacturer's Association (S.E.M.A) Code of Practice is considered within the storage industry as the safe minimum standard with which to measure the safe condition of racking. These recommendations include:

'For an upright bent in a lateral direction from its front, a vertical concave dent exceeding 5 mm over a 1000 mm plane of measurement is considered dangerous and should be decommissioned and replaced.'

'For an upright bent in the plane of the frame bracing, a vertical dent exceeding 3 mm over a 1000 mm plane of measurement is considered dangerous and should be decommissioned and replaced.'

'For an upright which has been damaged such that there is a simultaneous bend in both longitudinal and lateral directions the left or right and front to back deformation shall be measured separately . . . and the appropriate limits observed'.

Although dominated by vision, operating an MHE is a highly cognitive task. It usually occurs in a visually cluttered environment, requires the simultaneous use of central and peripheral vision and involves relatively complex MHE-control activities. While functional differences between the central and peripheral visual fields are well documented, the linkage between the two is less understood. In a typical test of the visual field, the operator fixates on the point where the raised palletized load is situated. Thus, a standard visual test cannot predict how efficiently an operator can use peripheral visual information in complex tasks such as operating MHE. Peripheral retinal sensitivity, under photopic and mesopic (artificial) lighting conditions, (such as is found in a typical warehouse environment) is considerably reduced compared to the central retina. This means that for an object to be seen peripherally it would need to be of higher intensity than if it was to be detected centrally. This can easily be attributed to the distribution characteristics of the human photoreceptors (rods and cones) on the retina. It has been shown that peripheral retinal sensitivity may be impeded as the amount of information the subject is required to process mentally is increased. This visual field "narrowing" applies to the warehouse environment and other tasks, such as the simultaneous controlling of speed and direction of the MHE and its load, navigating with aisle signs and using in-MHE information systems.

As a consequence, important visual stimuli in the periphery of a person's vision may remain undetected when cognitively demanding tasks involving central vision are being performed. Thus, the proximity of the MHE to the vulnerable lower sections of an upright section is difficult to monitor in a manner that is reasonably practicable and the risk of impacts occurring increases. Invariably, such damage has direct costs to an organization's resources. Warehouse maintenance may absorb an average of only five percent of total warehouse costs but any neglect of the issues can have cost consequences far beyond that fraction. Damage to racking incurs both direct costs (e.g. component replacement and labor costs, damaged stock, damaged MHE, accidents and incidents) and indirect costs (e.g. reduced storage capacity, administration costs, employee absence, litigation, increased insurance premium, adverse publicity and overall disruption of business).

One type of known column protector comprises a metal shield which is bolted to the, typically concrete, floor at the base of a column, and shields the column from impact by transmitting the impact force down through the floor, and having an air gap between the metal shield and the column. However, such column protectors require penetrating expansion bolts, which compromise the integrity of the concrete floor, and over time are subject to degrading or working loose. Further, on impact, they are prone to buckling and bending, or the bolts are ripped out of the concrete when subject to impact from a vehicle or MHE. They are also time consuming to replace when damaged, and replacement can be made more difficult where the bolts have sheared or bent, or have damaged the concrete floor. Replacement of a single protector can take up to 25 minutes. Examples of such protectors are found in U.S. Pat. No. 5,369,925.

Another type of column protector comprises a single piece molded plastics shroud, having a flat outer face and straight side portions connected by rounded portions so as to form a substantially "U" shaped single piece member which protects one side of a column post. Such protectors are fitted around a column by tensioned wire straps or bands and protect one side of the column. Where all round protection of the column or post is required, two such protectors can be fitted back to back around the post, and retained by longer wire straps or bands. However, this type of protector is bulky because it relies on a single molded piece to absorb all impact forces, and therefore that molded piece has to be relatively thick. This means that the rack needs to be spaced further apart to allow access for vehicles and mechanical handling equipment. Additionally, removal of the protectors for inspection of the column requires cutting of the straps and fitting new straps. With this type of know protector, serious damage to a column after an impact can go undetected because removal of the protector is not easy. An example of this type of impact protector is disclosed in U.S. Pat. No. 6,242,070.

Another type of known column protector comprises a rigid square or rectangular outer shell, a first and resilient inner lining, and a second resilient inner lining intermediate between the outer shell and the first inner lining. The inner lining wraps around a column, and closely fits the column. They are attached to the column by means of ties or straps between the free edges of the outer shell at the rear of the protector. The outer and inner shells are shaped to be rectangular or square, fitting around the substantially rectangular outward facing portions of the columns. Such column protectors are inefficient at dissipated impact forces due to their shape, having outer surfaces which lie parallel to the surfaces of the underlying columns, and act to transfer impact forces undeflected, in a direction directly to the underlying columns. They also suffer from the problem of splitting at their edges when subjected to impact. Additionally, their removal and replacement generally requires tools and new wires, ties or straps to attach the protector to the racking column upright, which in turns dissuades inspection of the parts of the column which are hidden from view by the protectors. Significant damage to the hidden parts of the columns can go undetected.

SUMMARY OF THE INVENTION

One object of embodiments disclosed herein is to prevent or reduce the likelihood of damage to racking uprights.

Another object of the embodiments disclosed herein is to mitigate actual damage to racking uprights to the lowest levels so far as is reasonably practicable.

The pallet racking upright protection device according to a specific embodiment disclosed herein self attaches to the front and lateral sides of an aisle facing rack upright. The composite protection device constitutes two or more major components. An outer component is made from a resilient elastomeric polymer based material that is semi tubular in shape. This outer component serves to deflect and diffuse kinetic energy of motion so as to prevent or minimize impact damage to the upright and the frame's components therein. An internal component of the protection device is made from a relatively less dense elastomeric material. This internal component is synergistic in form and function to the external component, and serves to receive and absorb and further diffuse the kinetic energy of motion from impacts and to promote the repositioning of the whole device to a position similar to before the impact occurrence.

According to a first aspect of the present invention, there is provided a column protector device for protection of an upright column of a racking system, said device comprising:
 an outer shell; and
 an inner liner shaped to fit within said outer shell;
 wherein said outer shell is configured to fit around said upright column, such that the outer shell retains to said column in a self attaching manner without the need for any additional fixings, and such that, in use, said inner liner is retained between said outer shell and said column.

Preferably, said column protector device is configured to attach to the front and lateral sides of an aisle facing rack upright.

Preferably said outer shell comprises an elongate member having a substantially "C" shaped cross section.

Preferably said outer shell comprises a substantially part cylindrical partial tube.

Preferably said outer shell comprises a tubular part cylindrical member having a pair of substantially parallel opposing edges, either side of a gap in said part cylindrical member.

Said part cylindrical member may extend over an angle in the range 260° to 280°, about a longitudinal centre line of said outer shell.

Said outer shell has a height in the range 30 cm to 120 cm.

Said outer shell outer shell may have an external diameter in the range 10 cm to 14 cm.

Said outer shell may have a wall thickness in the range 7 mm to 9 mm.

Said outer shell may have a distance between opposing longitudinal edges in the range 5 cm to 11 cm.

Said outer shell may comprise a chamfered edge positioned at an end of the shell, between an upper face of the outer shell and an inner surface of the shell.

Said outer shell may be made from a resilient elastomeric polymer based material.

At least one material of the outer shell may be selected from the set: Polyethylene; Polypropylene; Polycarbonate; Polyvinylchloride; Polystyrene plastic; or a mixture of plastics.

Said outer shell may be made from a high density polyethylene material.

Preferably said inner liner comprises a part—cylindrical member.

Preferably, said inner liner comprises a substantially solid part—cylindrical member having a substantially part cylindrical outer surface, and a substantially "U" shaped channel formed on an opposite side of said liner to said substantially cylindrical outer surface.

Said inner liner may comprise an elastomeric material which is relatively less dense than a material of said outer shell.

Said inner liner may comprise a material selected form the set: Polyethylene; Polypropylene; Polycarbonate; Polyvinylchloride; Polystyrene; natural rubber foam; synthetic rubber foam; a compressive composite material.

Said inner liner may comprise a closed cell SBR foam material.

Preferably, said inner liner has a height in the range 30 cm to 120 cm.

Preferably, said inner liner has an external diameter in the range 10 cm to 14 cm.

Said inner liner may have a "U" shaped channel of width in the range 7 cm to 12 cm.

Said inner liner may have a "U" shaped channel of depth in the range 2 cm to 4 cm.

Said inner liner may have a "U" shaped channel, and wherein a maximum distance of an outer surface of the "U" shaped channel to the outer part cylindrical surface is in the range 2 cm to 5 cm.

Preferably, said inner liner is configured such that, after receiving an impact, the inner liner promotes the repositioning of the whole device to a position similar to a position of the device before an impact occurred.

Preferably, said outer shell, when fitted to an upright column, having a front member and first and second side members, surrounds the front member, and partially surrounds first and second side members thereby protecting the front member and parts of the side members from direct impact and partially surrounds each of the first and second side members, and said outer shell also surrounds said inner liner, which resides, in use between a substantially part cylindrical inner surface of the outer shell, and an outer face of the front member, an outer face of the first side member and an outer face of the second side member.

In some embodiments, said inner liner and said outer shell may be slideable with respect to each other in a direction along a main central axis of said outer shell.

In other embodiments, said inner liner is bonded to an inner surface of the outer shell, such that the inner liner is fixed relative to the outer shell and cannot slide relative to the outer shell.

The column protector device may further comprise a polycarbonate outer sheath which fits outside the outer shell and which is selected such that it shall only fail to crack propagation from forces that would exceed the device's maximum designed impact tolerance.

The column protector device may further comprise a polycarbonate insert member which is capable of being inserted between the device and the front face of the column upright and which is capable of being slid out from such position for removal and capable of being re-inserted, for visual inspection purposes without the need to remove the outer shell or inner liner form the column upright.

According to a second aspect, there is provided a column protector device for protection of an upright column of a racking system, said device comprising:
a substantially part cylindrical tubular outer shell; and
an inner liner shaped to fit within said outer shell.

According to a third aspect there is provided an upright column protector device comprising:
an assembly of elastomeric synthetic compound components that partially encapsulate the principal elements of the vertical sections of a metal pallet rack for the purpose of preventing impact damage caused to the pallet rack by mechanical handling equipment.

Preferably, the assembly of multilateral, semi tubular, components has greater ductility, impact resilience and persistence of shape than that of the metal rack component it is attached to.

Preferably, the assembly of components does not essentially concomitant an integrated or independent fastening or securing mechanism or mechanisms or bonding agent with which to be fixed to a pallet rack.

Preferably, there is an external component that is semi tubular in shape and is manufactured from, a material selected from: Polyethylene, Polypropylene, Polycarbonate, Polyvinylchloride or Polystyrene plastic; or a mixture of plastics.

Preferably, there is an internal component that is synergistic in form and function to that of the external component and is manufactured from a material selected from: Polyethylene, Polypropylene, Polycarbonate, Polyvinylchloride or Polystyrene, natural or synthetic rubber foams or compressive composite materials.

Other aspects are as recited in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

An embodiment of an upright column protector below according to the current invention is illustrated in the accompanying drawings.

Figure 1:
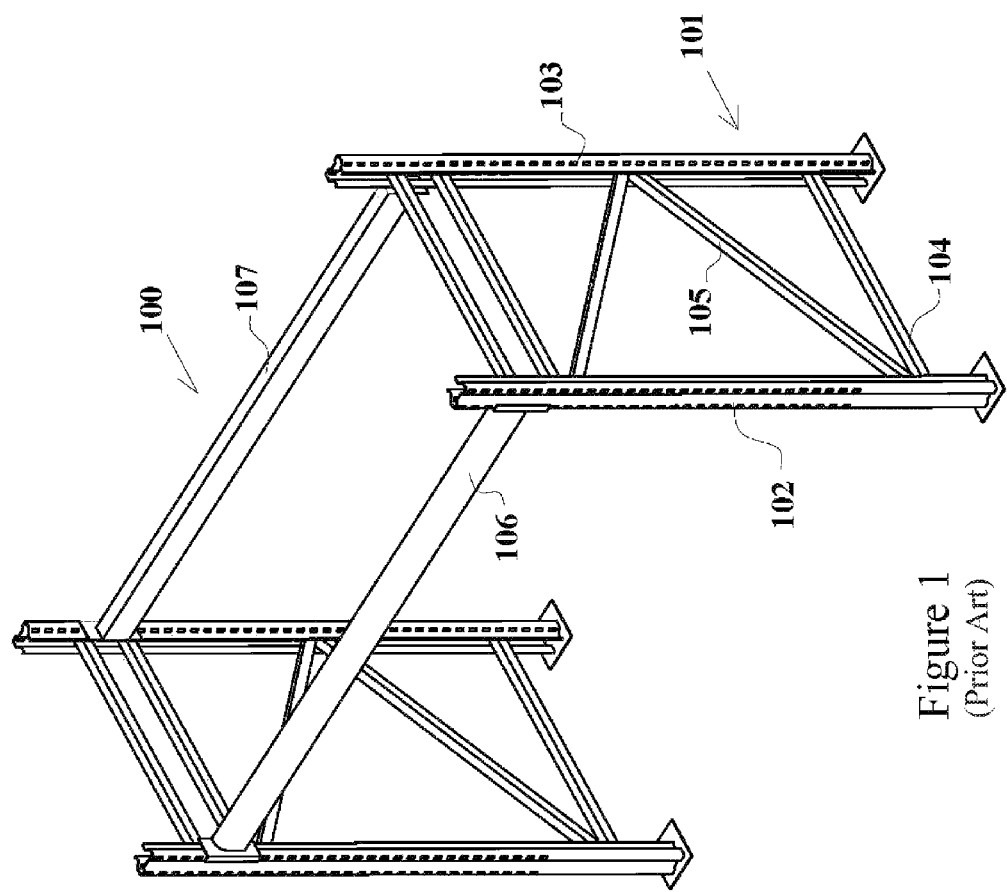
FIG. 1 shows schematically in perspective view, one bay of a known pallet racking system.
Figure 2:
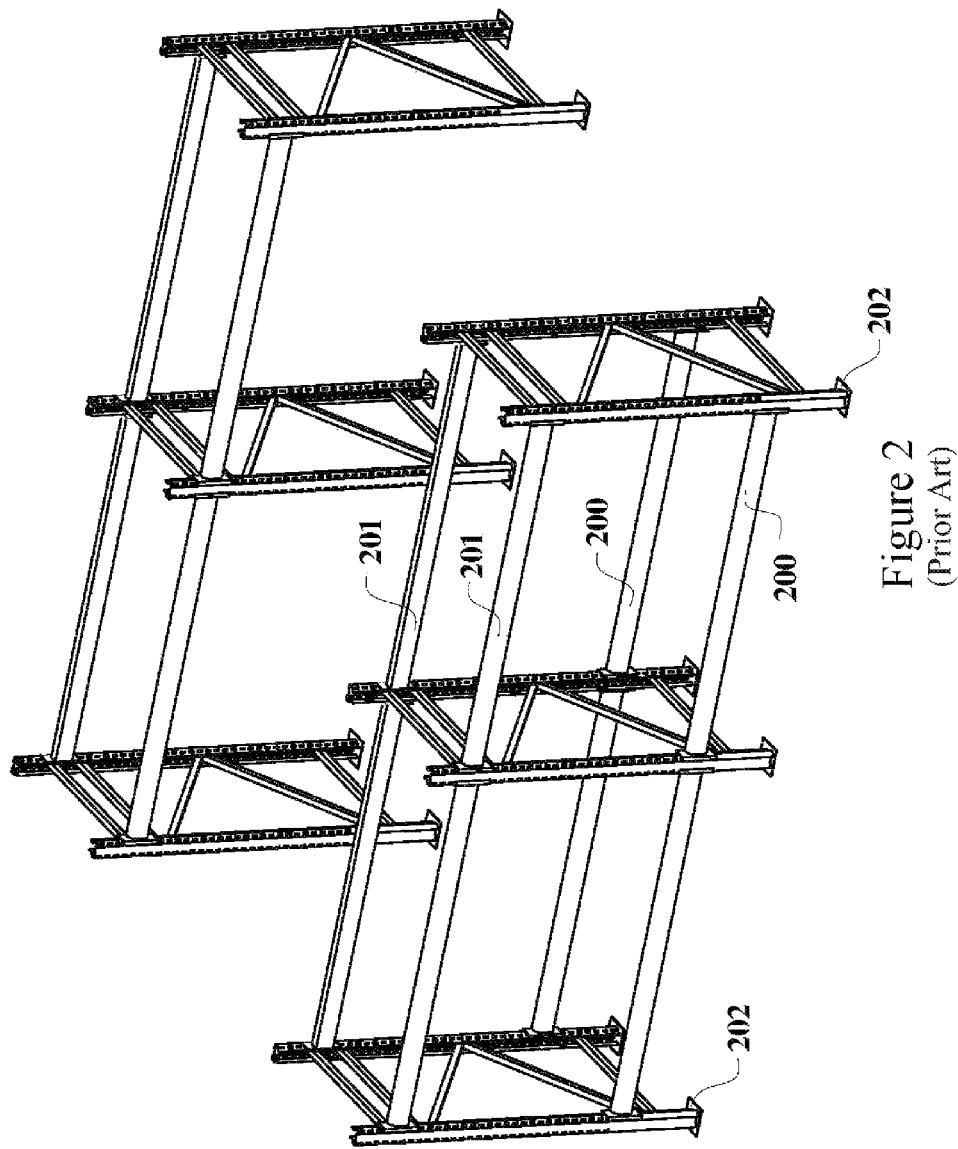
FIG. 2 shows schematically in perspective view from above, first and second rows of bays, each row comprising a pair of racking bays.
Figure 3:
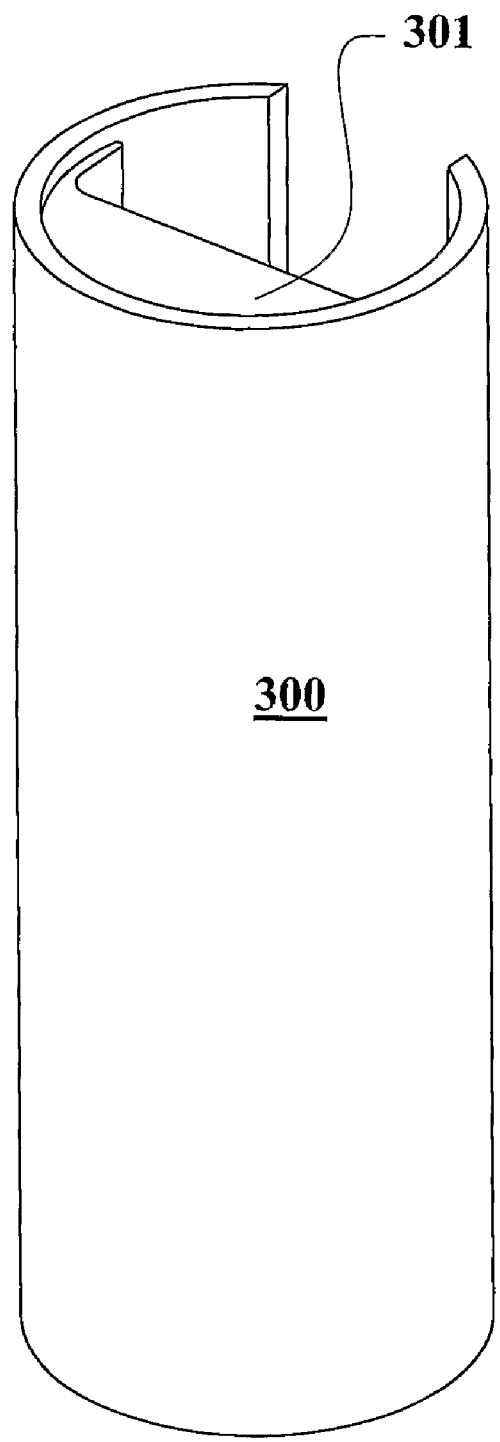
FIG. 3 shows in perspective view a column protector device according to a first specific embodiment.

Referring to FIG. 3 herein, there is illustrated schematically a column protector device according to a first specific embodiment of the present invention. The column protector device comprises an elongate tubular outer shell 300 of a substantially part cylindrical shape, having in cross section, a substantially "C" shape; and, an inner liner 301 which fits inside the outer shell, and in use fits between the outer shell and a column upright of a racking system, which the column protector device attaches to In the first specific embodiment, the outer shell 300 is slideable with respect to the inner liner 301 in a direction along a main length of the outer shell, which is also substantially parallel to a main length of the inner liner. Preferably, the inner liner has a main length dimension less than or equal to a main length of the outer shell 300, so that, in use, the outer shell 300 extends slightly beyond the inner liner 301. In the general case, the outer shell 300 is intended to protect the inner liner 301 against direct impact from mechanical handling equipment, vehicles or the like. Any impact from external sources, in general will not penetrate the outer shell 300. However, the outer shell in general will transfer force of impact to the inner liner 301, which acts to absorb and diffuse the energy resulting from any impact incident on the outer shell, by spreading that energy and force over a relatively large area.

In the first specific embodiment, the outer shell is slideable with respect to the inner liner, so that the outer shell can be slid upwardly when grasped by a person, allowing for visual inspection of the inner liner and/or the racking upright to which the device is fitted, without having to remove the whole device. Consequently, routine visual checking for damage of the uprights along a row of bays can be achieved quickly by a single person.

Figure 4:
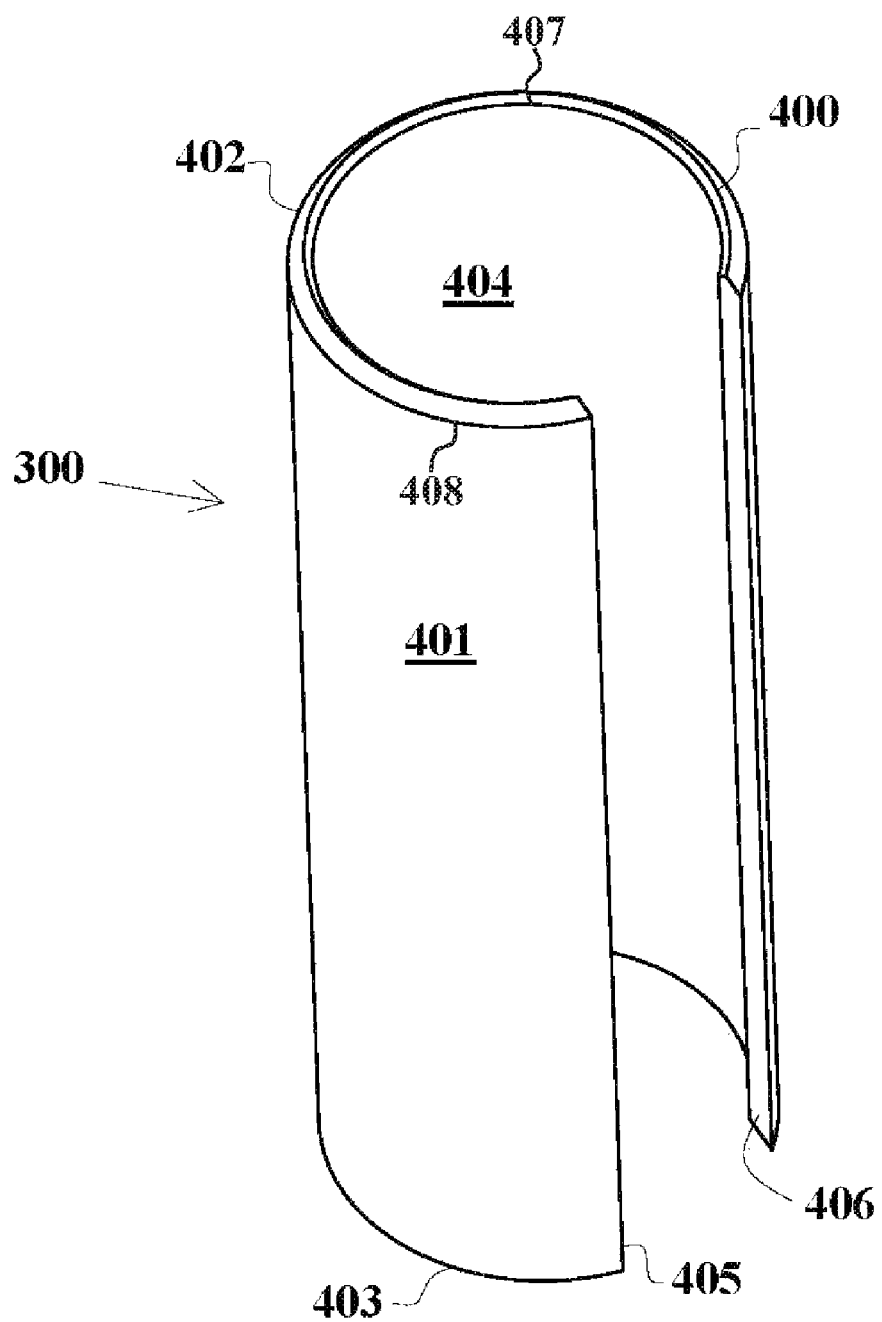
FIG. 4 shows in perspective view, from the rear, an outer shell comprising the column protector device of FIG. 3.

Referring to FIG. 4 herein there is illustrated schematically in perspective view the outer shell 300. The outer shell comprises a substantially cylindrical tubular member 400 having a smooth substantially cylindrical outer surface 401 extending between a first end 402 and a second end 403; a smooth substantially cylindrical inner surface 404 arranged concentrically with the outer surface 401, thereby forming a substantially cylindrical wall of a substantially "C" shaped cross section, in the form of a tubular cylindrical pipe having a section of its outer wall removed.

Typically, the outer shell may be formed from a hollow semi tubular substantially cylindrical pipe, of which part of the outer wall has been removed along the whole length of the pipe, such that the outer shell forms a channel having first and second exposed edges 405, 406 extending between the first and second ends and running along a whole of the length of the outer shell, and which oppose each other across a gap. Typically, the wall may extend over an angle in the range 260.degree. to 280.degree., about a longitudinal centre line of said outer shell, with a gap in the wall extending over the remaining 100.degree. to 80.degree. of a complete circle. First and second longitudinally extending surfaces 405, 406 in the embodiments shown are substantially parallel to each other, but in other embodiments, the surfaces may extend substantially radially from a center point of the tubular member center line of the substantially tubular outer shell.

At first end 402, there may be provided a chamfered edge 407 between upper face 408 of the outer shell and the inner surface 404, to facilitate sliding of the inner liner with respect to the outer shell form a position form above the outer shell, and vice versa, to facilitate sliding of the outer shell with respect of the inner liner. Similarly, an equivalent lower chamfered edge may be provided at the second end 403 between a lower face of the outer shell and the inner surface 404, so that the outer shell is symmetrical, and can be turned upside down with equivalent effect. The lower chamfered edge may assist in preventing snagging of the lower end of the outer shell on the inner liner as the outer shell is slid over the inner liner in a direction from above the inner liner.

The outer shell is preferably formed from a ballistics grade High Density Polyethylene (HDPE) material. Such materials have high resistance to impact at temperatures in the range above 5° C., and have good impact resistance properties at temperatures in the range 5° C. down to −40° C. The outer shell may be colored in a high visibility color such as bright yellow, bright redorange, or green.

Figure 5:
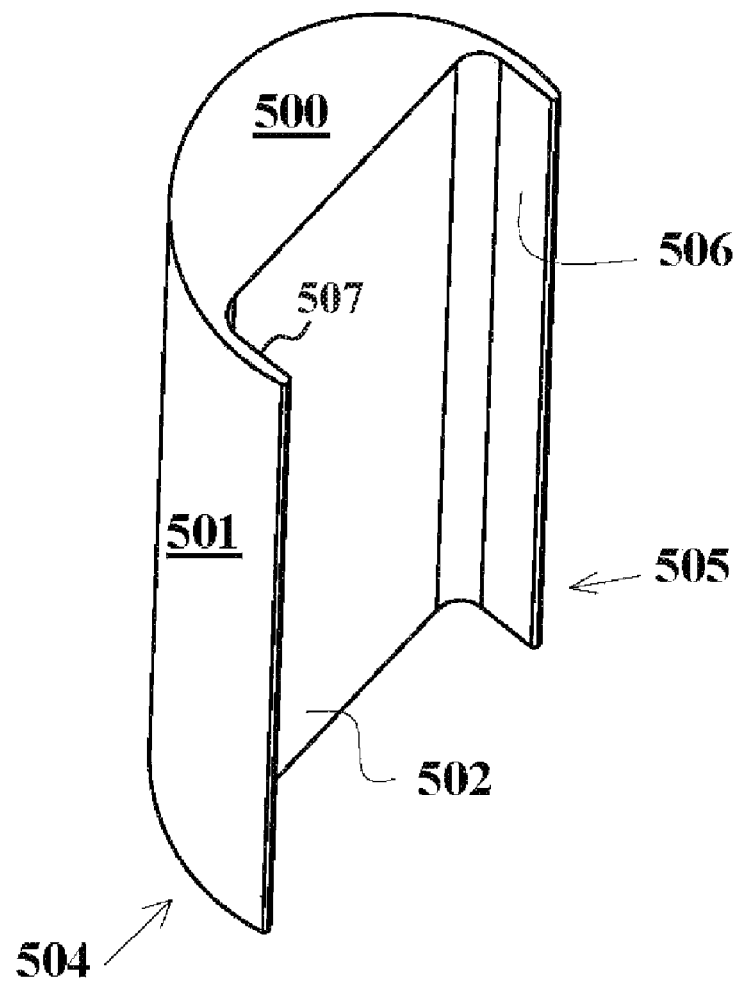
FIG. 5 shows in perspective view, from the rear, an inner shell comprising the column protector device of FIG. 3.

Referring to FIG. 5 herein, there is illustrated schematically in perspective view from above, the inner liner 301.

The inner liner comprises an elongate solid body 500 having an outer surface comprising a substantially cylindrical portion 501, and a substantially "U" shaped channel portion 502, the substantially "U" shaped channel 502 residing within part of the substantially cylindrical shaper outer portion to provide first and second wall portions, 505, 504 respectively which face opposite each other. The "U" shaped channel comprises a substantially planar surface 506, which extends across and between opposite positions of the substantially part cylindrical outer surface 501, and arranged transversely to the planar channel, a first substantially flat planar wall surface 506 facing inwardly towards the center of the cylinder, and a second substantially flat planar wall surface 507 facing opposite the first wall surface. The two planar wall surfaces oppose each other and are separated from each other by a width distance of the planar channel surface.

Without limitation to the general range of shapes and sizes of the outer shell, in various embodiments the outer shell may have dimensions as follows:

Height in the range 30 cm to 120 cm, and preferably in the range 55 cm to 65 cm.

External diameter in the range 10 cm to 14 cm, with preferred embodiments having an external shell diameter in the range 10.3 cm to 11 cm.

Wall thickness in the range 7 mm to 9 mm.

Distance between opposing longitudinal surfaces 405, 406 in the range 5 cm to 11 cm.

Without limitation to the general range of shapes and sizes of the inner liner, in various embodiments the inner liner may have dimensions as follows:

Height in the range 30 cm to 120 cm.

External diameter in the range 10 cm to 14 cm.

Width of the "U" channel in the range 7 cm to 12 cm.

Depth of the "U" channel in the range 2 cm to 4 cm.

Maximum distance of the outer surface of the "U" shaped channel to the outer part cylindrical surface of 2 cm to 5 cm.

The skilled person will appreciate that particular sets of dimensions have advantages for fitting to particular sizes of pallet racking uprights. In particular, embodiments having sets of dimensions as follows have been found to be particularly advantageous:

FIRST EMBODIMENT

| | | |
|---|---|---|
| Outer shell: | Height: | 59 cm ± 5 mm. |
| | Diameter: | 10.7 cm ± 2 mm |
| | Wall thickness: | 7 mm ± 1.5 mm |
| | Cut away angle: | 85° ± 5° |
| | Circumference around outer shell between longitudinal edges: | 27.3 cm ± 5 mm |
| Inner liner: | Height: | 59 cm ± 5 mm. |
| | Diameter: | 9 cm ± 1 mm |
| | "U" channel width: | 7.8 cm ± 2 mm |
| | "U" channel depth: | 2.6 cm ± 2 mm |
| | Max. distance "U" channel surface to outer surface: | 3.6 cm ± 2 mm |

SECOND EMBODIMENT

| Outer shell: | Height: | 60 cm ± 5 mm. |
| --- | --- | --- |
| | Diameter: | 12.5 cm ± 2 mm |
| | Wall thickness: | 8 mm ± 0.5 mm |
| | Cut away angle: | 90° ± 5° |
| | Circumference around outer shell between longitudinal edges: | 28.8 cm ± 5 mm |
| Inner liner: | Height: | 59 cm ± 5 mm. |
| | Diameter: | 10.6 cm ± 1 mm |
| | "U" channel width: | 9.0 cm ± 5 mm |
| | "U" channel depth: | 1.4 cm ± 7 mm |
| | Max. distance "U" channel surface to outer surface: | 3.0 cm ± 4 mm |

Figure 6:
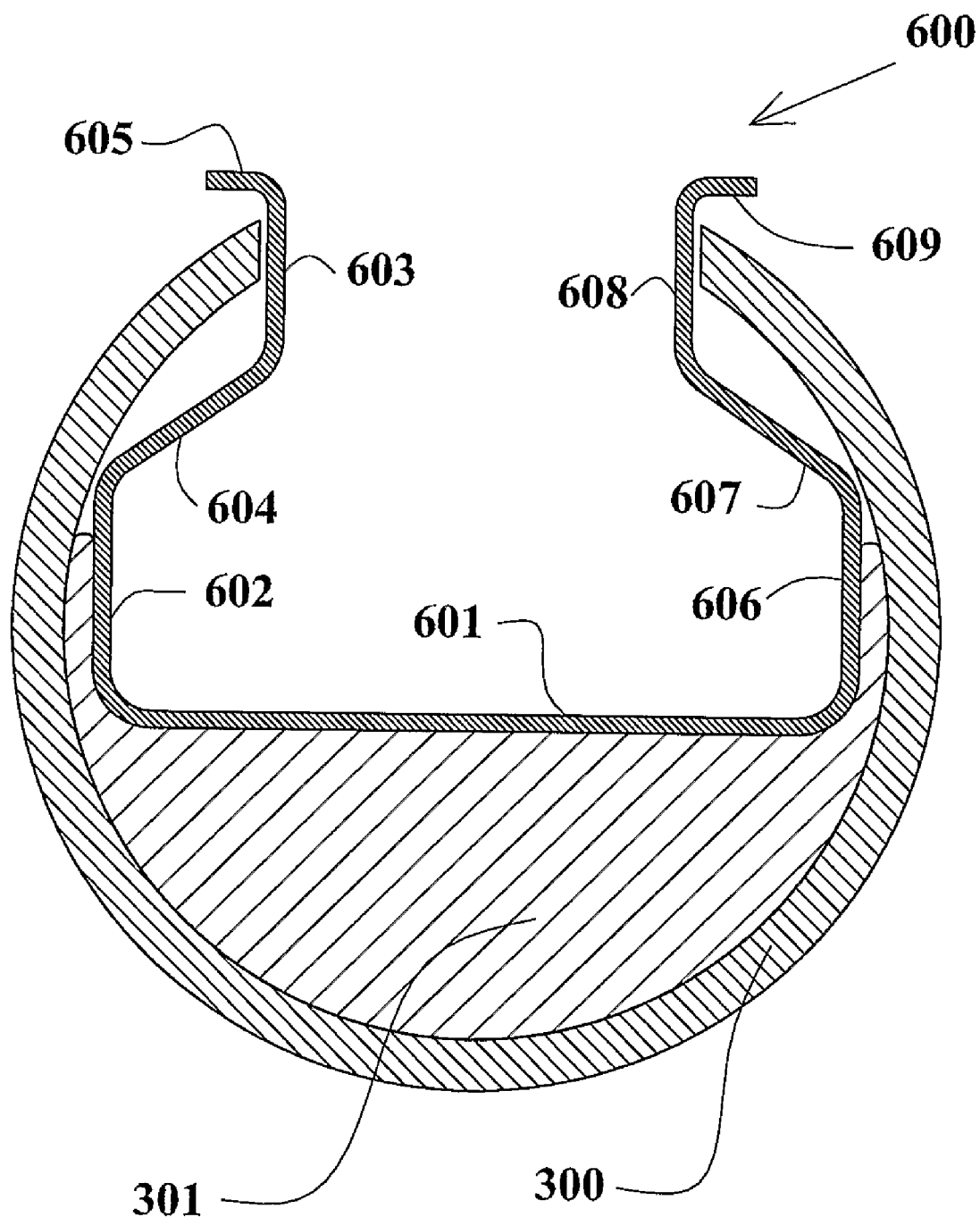
FIG. 6 shows in cut away view from above, the column protector device of FIG. 3 in situ fitted to a column of a racking system.

Referring to FIG. 6 herein, there is illustrated schematically in cut away cross section from above, a column post 600 of a racking system, having the column protector device installed. The known post comprises an elongate metal member 600 which is channel shaped in cross section, and presenting a substantially rectangular front aspect, the member comprising a front member 601; a first outer side member 602 connected to the front member 601 at one edge thereof and extending laterally from the front member; a first inner side member 603 disposed inwardly of the first outer side member 602, and extending approximately parallel thereto, and transverse to a main plane of the front member; a first connecting side member 604, connecting the first outer side member and the first inner side member, and extending in a plane transverse to a main plane of the front member, transverse a main plane of the first outer side member, transverse to a main plane of the first inner side member; and a first lip member 605 extending from one edge of the first inner side member and extending in a plane approximately parallel to the main plane of the front member; a second outer side member 606 connected to an opposite edge of the front member 601 to the first outer side member, and extending laterally from the front member; a second inner side member 608 disposed inwardly of the second outer side member 606, and extending approximately parallel thereto, and transverse to a main plane of the front member; a second connecting side member 607, connecting the second outer side member and the second inner side member, and extending in a plane transverse to a main plane of the front member, transverse to a main plane of the second outer side member, transverse to a main plane of the second inner side member; and a second lip member 609 extending from one edge of the second inner side member, opposite to an edge where the second inner side member connects with the second connecting member, and extending in a plane approximately parallel to the main plane of the front member.

The outer shell 300, when fitted to the column, surrounds the front member 601, the first and second outer side members 602, 606 and the first and second connecting side members 604, 607, thereby protecting them from direct impact with vehicles, MHE and the like, and partially surrounds each of the first and second inner side members 603, 608. The outer shell also surrounds the inner liner 301, which resides, in use between the substantially cylindrical inner surface of the outer shell 300 and an outer face of the front member 601, an outer face of the first outer side member 602 and an outer face of the second outer side member 606.

The pallet racking protection device directly encapsulates the external frontage and lateral sides of an aisle facing frame upright. The device does not necessarily require any additional fastening devices to secure it in place due to the innate elastomeric properties of the material is manufactured from. Rather, the column protector device simply 'clips' onto a column upright, and can be installed in less than 10 seconds, by a person with having only a small amount of practice at fitting the column protector, and without the need for any separate fixings or fasteners. After an impact event occurs, the elastomeric construction of the polymer materials revert to their equilibrium configurations and thus the device returns to its original dimensions.

Without this device, the kinetic energy motion is concentrated within a relatively small area on the upright instantaneously. Therefore, a very large dynamic force is transmitted from the MHE to the upright. This acute change in velocity and exchange of impact energy exceeds the structural tolerances of the racking causing damage and increased hazards and risks associated with collapsing weight bearing structures.

The outer shell 300 acts as an external 'shock deflector' component. Preferably, the outer shell 300 is manufactured from, but not necessarily, a polymer based material, preferably high density polyethylene. Further, the outer shell component is of such dimensions and mass so as to veer and diffuse kinetic energy of motion it receives away and around the upright it is attached to. Additionally, it is manufactured in such a form so as to posses a very strong internal cross linked polymer composition that enhances its impact deflecting and shock diffusing properties. The semi tubular shape together with the innate properties of tubular extruded high density polyethylene gives this outer component a low friction coefficient surface with high density properties. This shape also accommodates the propagation of shock forces internally along its curved structure away and toward the rear of the upright into the ambient atmosphere. This 'curving' of the component also increases the length of the penetration path by 1/sin of the sloping angle to any off center impacts. The simultaneous deflecting and diffusing action will greatly reduce the impact forces from being transmitted to the vulnerable front and lateral faces of the rack upright. Further, the external 'deflector' is of such dimension that it also offers deflecting protection to the rear of the upright from loads being removed from the racking thus mitigating the probability of the uptight receiving twisting deformation within its own axis.

The inner liner 301 acts as an internal 'shock isolator' component. The inner liner, of the device is of such a shape and form so as to provide a flush interface between the internal profile of the inner liner component 301 and various types of external profiles of different manufacturing types of racking uprights. The inner liner component encapsulates the front face and portions of the lateral sides of the upright. This component is manufactured from, but not necessarily, closed cell SBR foam. The shape, mass, density and internal structure of the shock isolator has such properties so as to induce inertia and an exaggerated path to shock forces. The inner liner receives residual kinetic energy of motion from the outer shell component, momentarily stores this energy and releases it over a relatively longer period of time and over a relatively larger internal surface area in all ambient directions. A proportion of this energy is rebounded back through the outer shell away from the racking. This whole process will eliminate or conduct a smaller dynamic force from reaching the upright that will then be within the safe impact threshold of the upright and avoiding residual damage to the racking components and goods stored therein.

Figure 7:
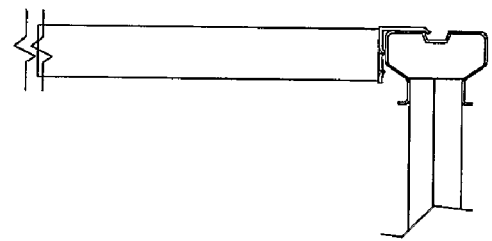
FIG. 7 shows schematically in view from above, the column protector device of FIG. 3 fitted to an upright column of a racking system.
Figure 7:
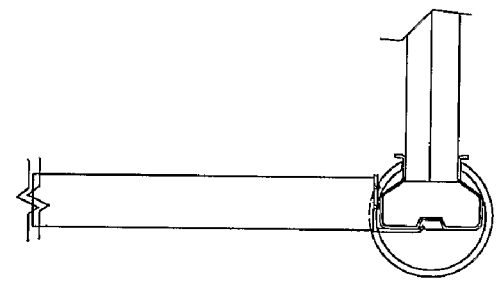
Figure 8:
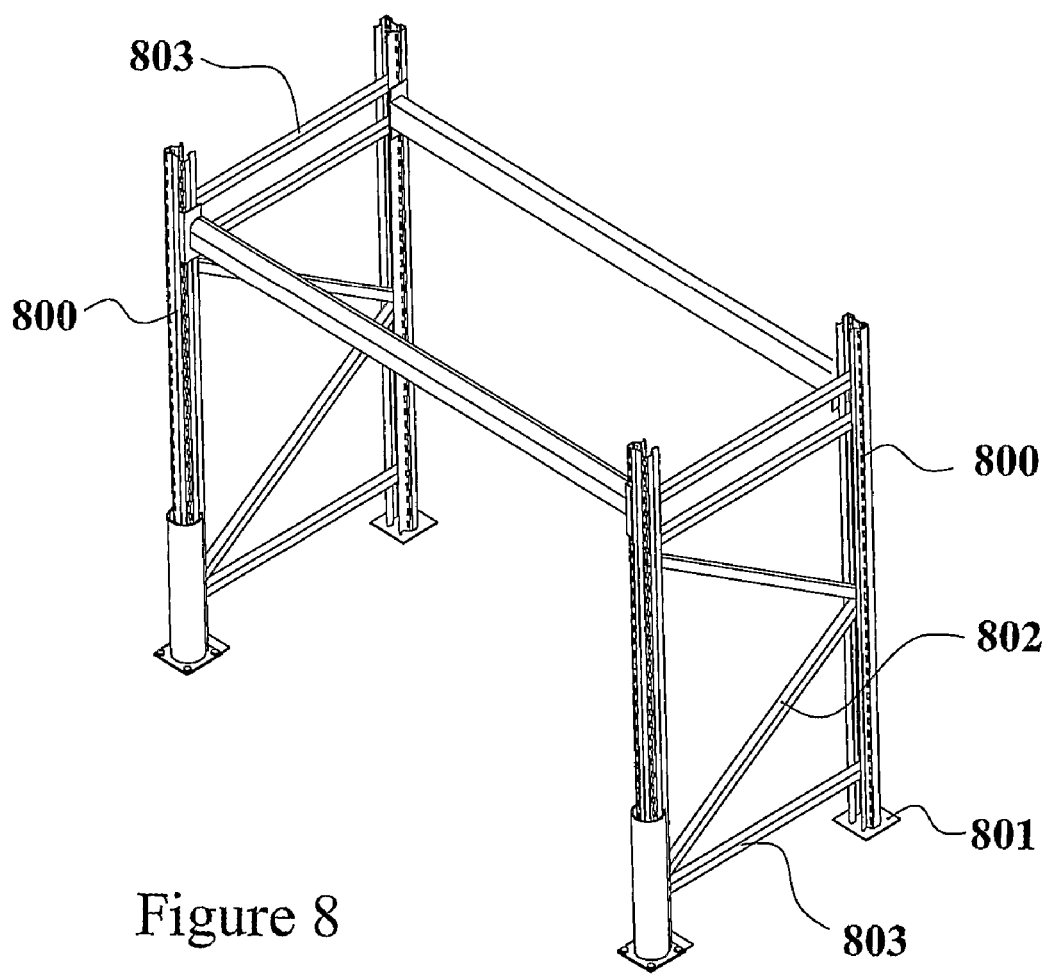
FIG. 8 shows schematically in perspective view from above, a single bay of adjustable pallet racking, fitted with two column protector devices as shown in FIG. 3 herein.

Referring to FIG. 7 herein there is shown schematically in view from above, the column protector device of FIG. 3 fitted to an upright column of a racking system;

Referring to FIG. 8 herein, there is illustrated schematically a single bay of a racking system fitted with two protector devices according to a specific embodiment herein. The racking frame consisting of a plurality of uprights 800, each having a standard footplate 801 and a plurality of diagonal cross bracings 802, and a plurality of horizontal cross bracings 803. The racking bay is fixed to floor with mechanical anchor bolt fixings through the footplates.

Figure 9:
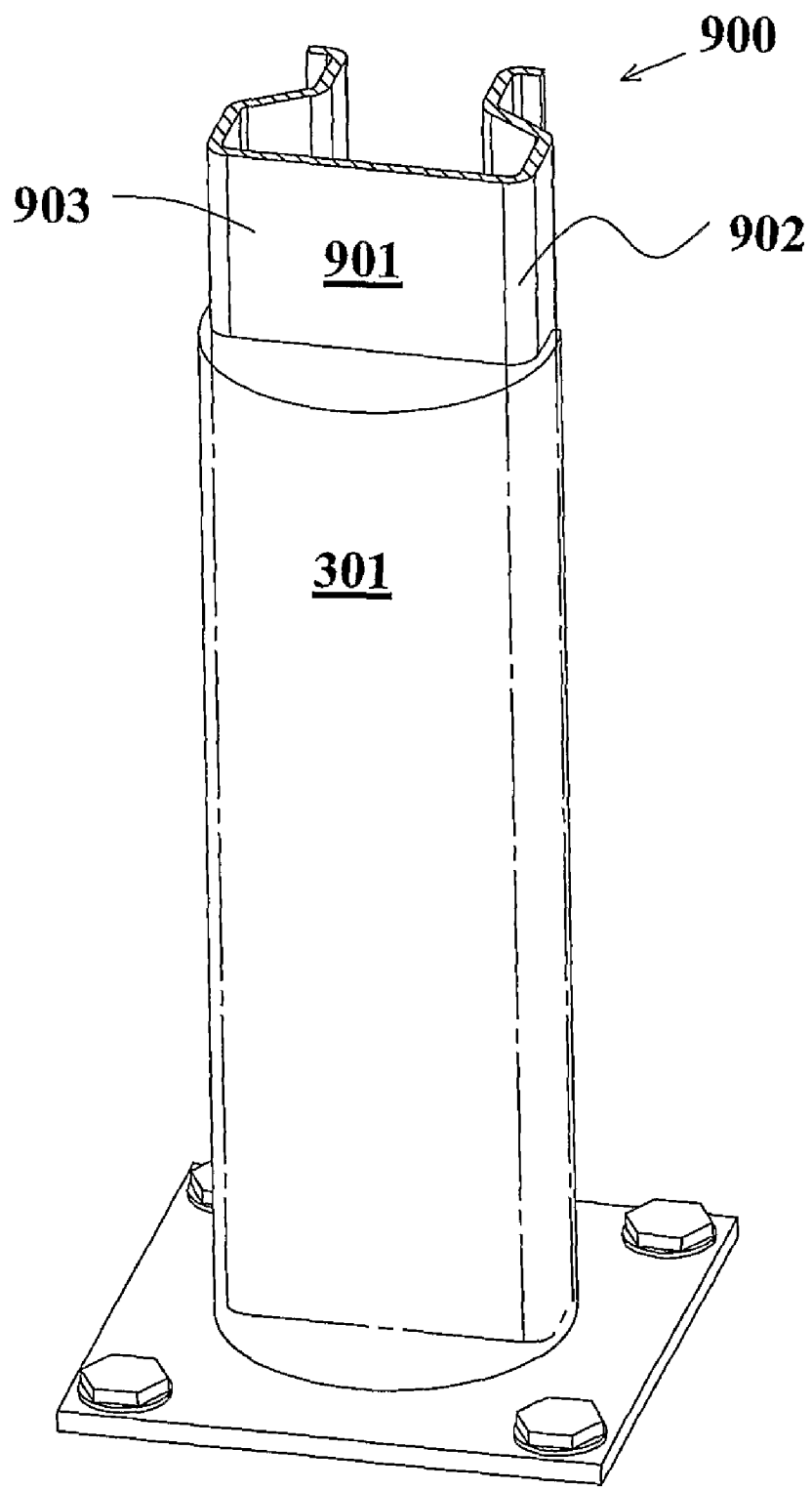
FIG. 9 shows schematically an inner liner of the column protector device of FIG. 3 fitted to a column, without the outer shell.

Referring to FIG. 9 herein, there is illustrated schematically a first stage of fitting the first specific embodiment of the column protector device to an upright column 900 of a racking system. Inner liner 301 is placed adjacent the upright 900 so that it rests against the upright, in loose contact with and abutting the upright column. The inner liner is designed for fitting around a first, outer front face 901 of the column, and to fit partially around a first lateral outer face 902 and a second lateral outer face 903 of the column, and may contact the outer front face and the first and second lateral faces.

Figure 10:
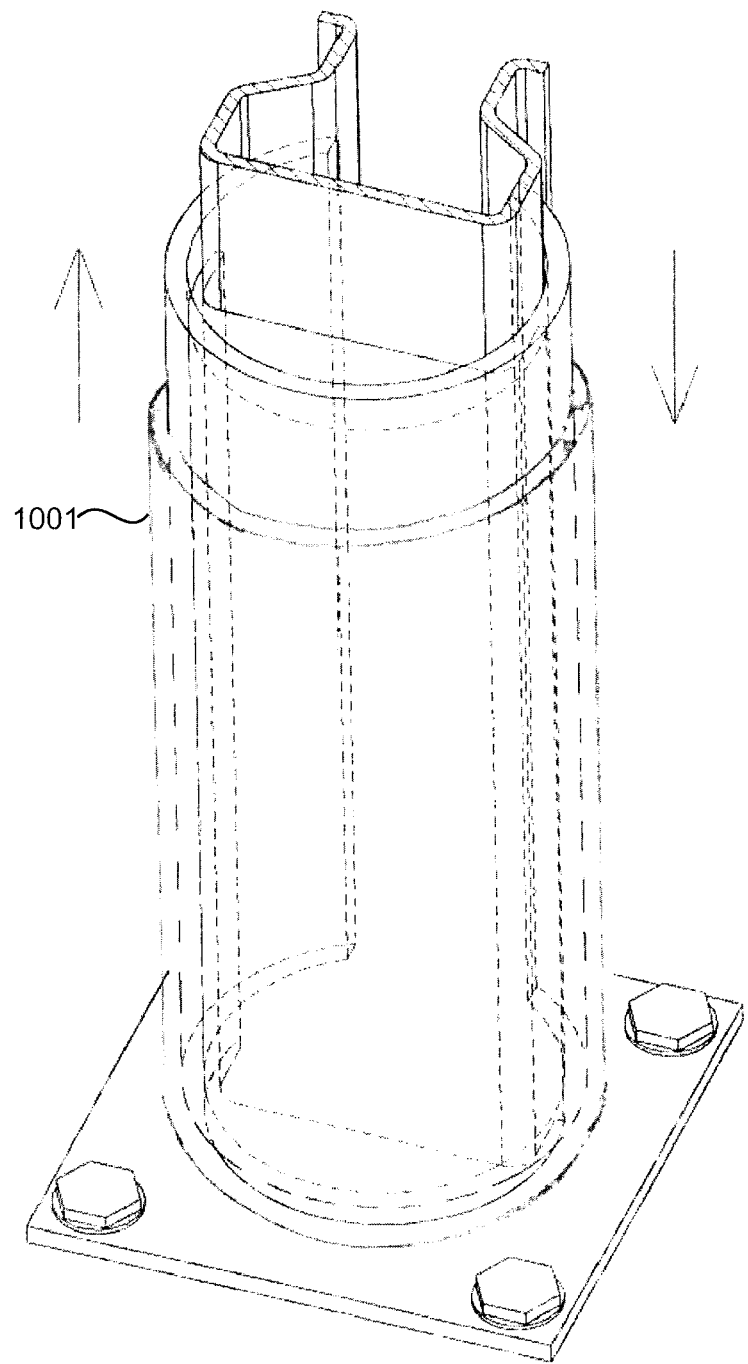
FIG. 10 schematically depicts the column protector device of FIG. 3 in situ fitted to a column and illustrating movement of the outer shell of the device relative to the inner liner, when movement of the outer shell for fitment to and removal from the column, and for column inspection.
Figure 10:
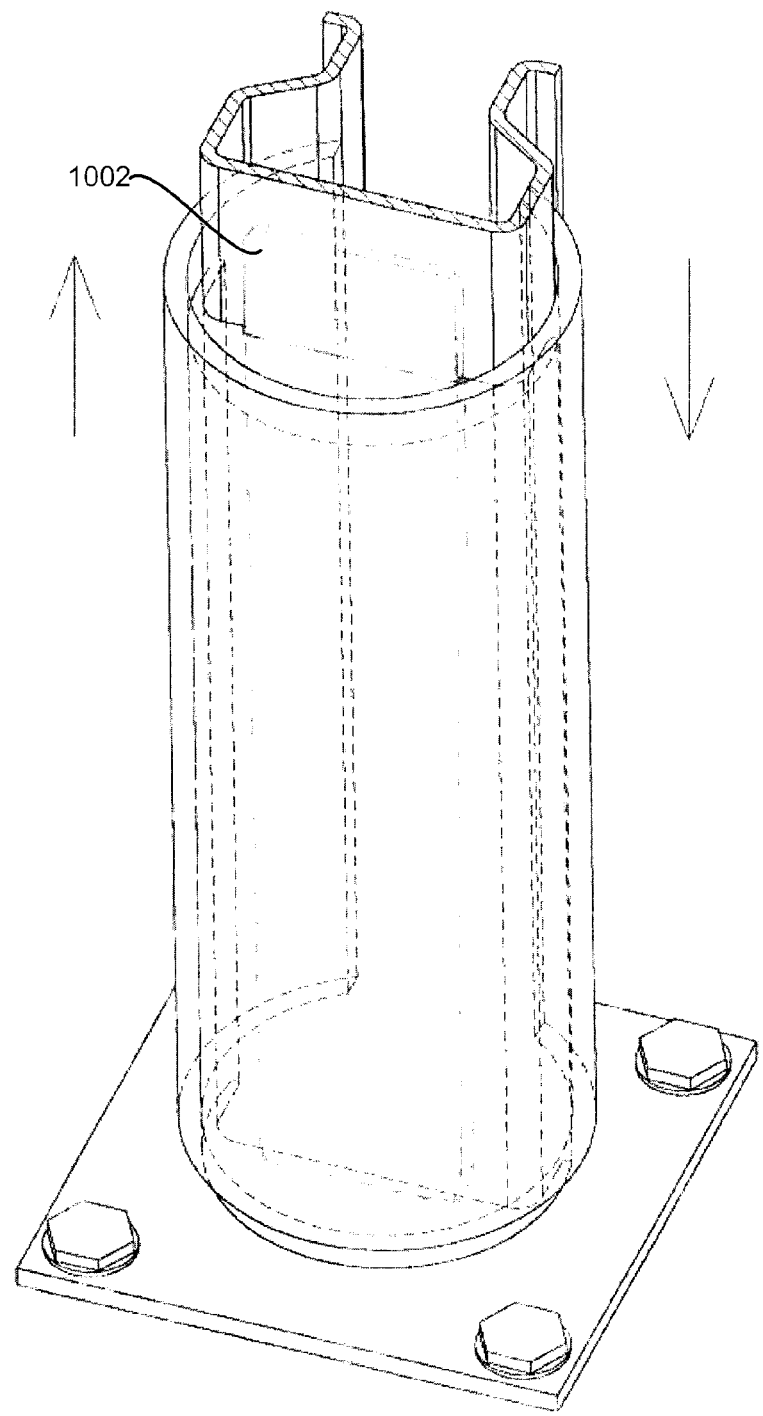

Referring to FIG. 10 herein, the outer shell 300 is then fitted over and around the column 300, at a position on the column above the inner liner, and then is slid down over the inner liner, so that the outer shell locates to partially enclose the column, as shown in FIG. 5 herein. The outer shell has a degree of flexibility such that it can be forced over the relatively wider part of the column upright, so that the column resides within the channel formed by the outer shell, and the peripheral edges 405, 406 lie adjacent the lateral sides of the column at a position where the column is relatively narrower.

Alternatively, the outer shell may be fitted to the column first, before the inner liner. In this method of fitment, the outer shell is slid around the wider outer facing part of the column, and forced over the wider part to a position in which the outer shell partially encloses the column, but without the inner liner interposed between the outer shell and the column. The inner liner is then slid down into the space between the inside of the outer shell and the front face of the column. The inner liner has sufficient deformability to be squeezed between the outer shell and the column, and has sufficient resilience to resume or approximately resume its normal uncompressed shape once in situ between the outer shell and the column.

The gap is wide enough to fit over a rack upright, so that the outer shell can be maneuvered over the inner liner placed adjacent and abutting the upright, and around the metal rack upright to locate with the surfaces 405, 406 adjacent the sides of the rack upright.

Figure 11:
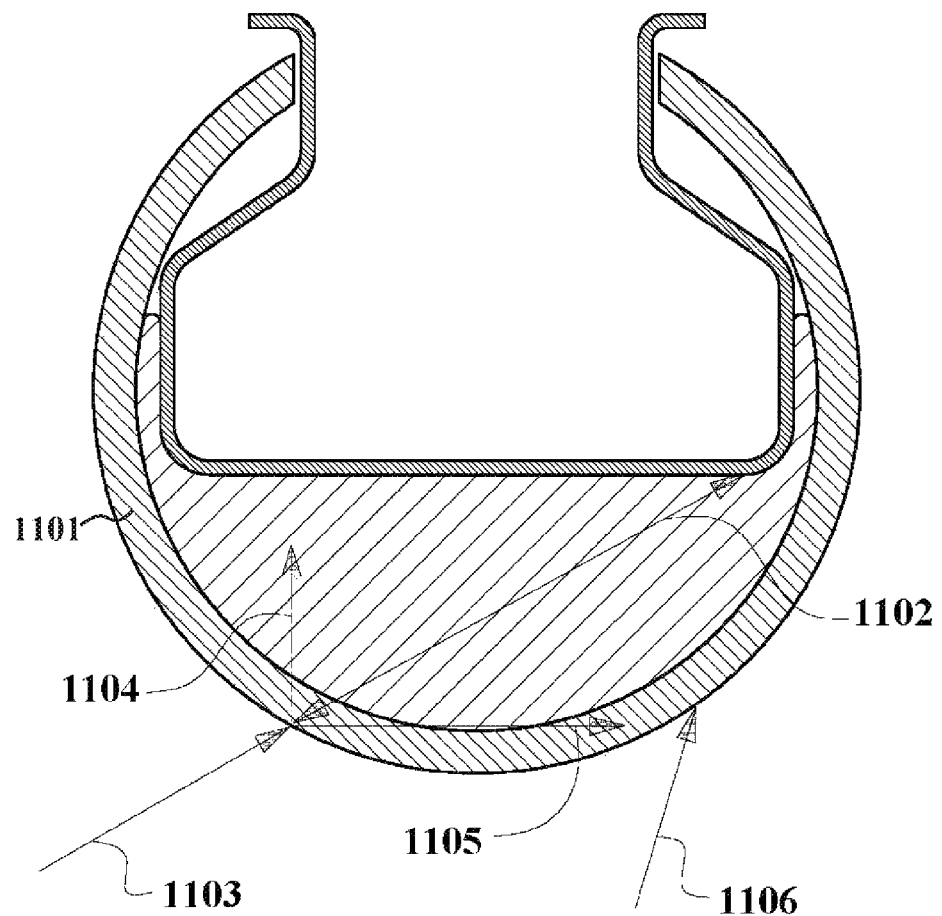
FIG. 11 illustrates schematically in cut away view from above, absorption and dispersion of impact forces incident on a column protector device fitted to a column upright of a racking system.

FIG. 11 shows a distinct advantage of the curved shape of the protection device. Off center impact forces to the external outer shell component 1101 are subjected to an increased length of penetration 1102, thus offering an increased impact resistance by shear design.

The impact forces, shown here as a vector 1103, comprise a first component 1104 in a direction normal to the front face of the column, and a second component 1105 in a direction parallel to the front face of the column, and second component 1105 in a direction parallel to the front face of the column. The energy of the impact is dissipated in the material of the outer shell and inner liner over a relatively longer distance in the material of the inner liner and outer shell than is the case with a known prior art impact protector having a substantially square or rectangular shape, and an outer linter having a face parallel to the front of the column.

Further, for an impact in a direction 1106 approximately normal to the front face of the column, the impact may be deflected by the round shape of the substantially part cylindrical outer shell, so that the vehicle or other machinery which collides with the column protector is more likely to be deflected away form the column and slide off the column protector.

In a second specific embodiment, the inner liner is bonded to an inner surface of the outer shell, such that the inner liner is fixed relative to the outer shell and cannot slide relative to the outer shell.

Modes of Impact Protection

The embodiments may provide protection for pallet racking by three separate modes, of (1) detection by humans of uprights; (2) deflection of impact forces, and (3) diffusion of impact energy.

Detection: In the first instance, impacts are avoided due to the conspicuous nature of the protector device, particularly where the embodiments are brightly colored. The protruding cylindrical outer shell is highly visible in a racking installation. Whilst an operator of an MHE is concentrating on loads at height, the device enhances its presence in the operators peripheral filed of vision.

Deflection: The external outer shell component, which is preferably made form ballistics grade high density polyethylene in some embodiments, has a low coefficient of friction, which combined with the shell's curved shape results in good performance at deflecting machinery. The polyethylene has a 'persistence of shape' which means that after impact, it has the ability to return to its original shape. The deflection property greatly reduces the impact forces form being transmitted to the vulnerable front and lateral portions of the column upright.

Diffusion: The inner liner is of such a shape and form that it provides a flush interface between the internal profile of its substantially "U" shaped channel and the various types of external rectangular profiles of known racking upright columns of different manufacturers. The inner liner occupies the space between the wall of the outer shell, and the column, with a shock absorbing and energy diffusing material, which encapsulated the front face and lateral side portions of the column. In embodiments where closed cell polyethylene foam is used for the inner liner, this is a very tough and durable material. The shape, mass and internal structure of the inner liner induces inertia and presents an exaggerated path to shock forces.

Visual Inspection for Damage

Periodically, the racking may be inspected for impact damage to prevent accidental collapse and for routine maintenance purposes. The specific embodiments herein may allow for quick and efficient visual inspection of the columns in the following ways:

Firstly, since the device does not fully encircle the column to which it is attached, the rear inner surfaces of the front member 601, first and second outer side members 602, 606 and first and second inner side members 603, 608 can be viewed form the rear of the column for dents or cracks, without the need to touch the device and with the device remaining in situ in position on the column.

Figure 12:
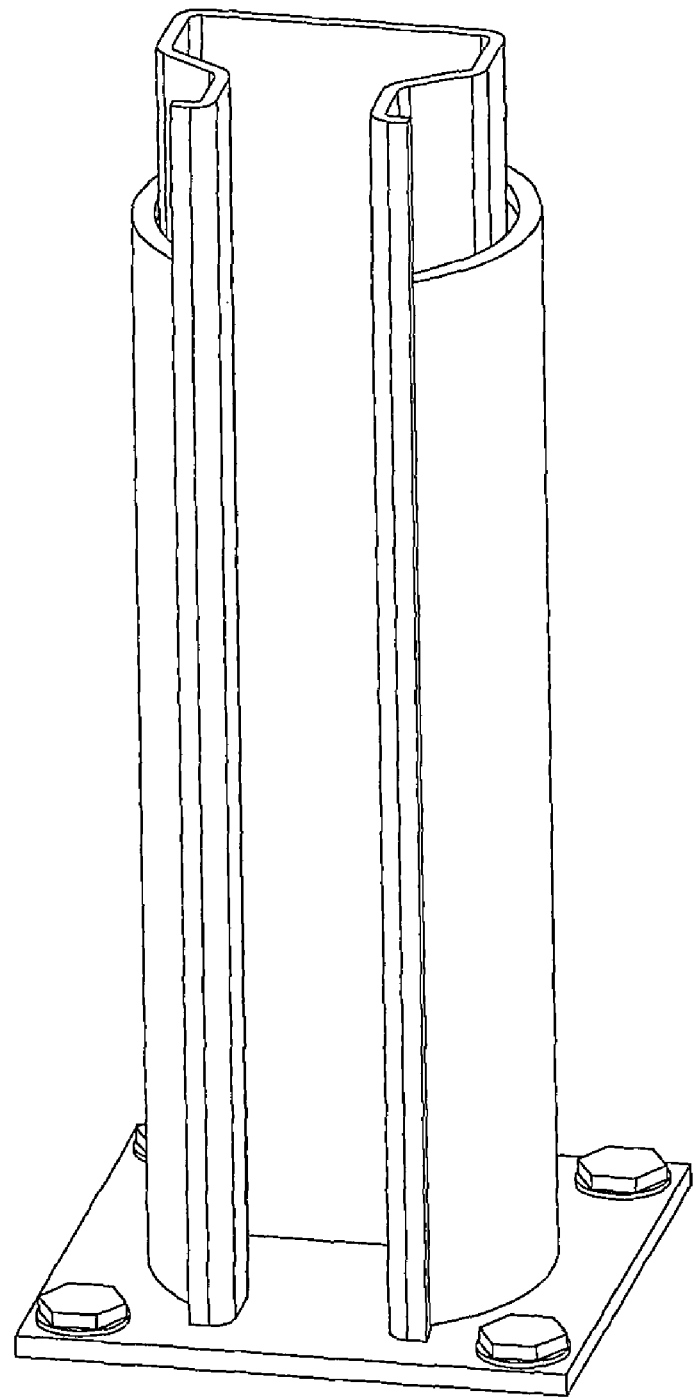
FIG. 12 shows a view of the column protector device fitted in-situ on a column, showing visibility of the interior of the column during visual inspection for column damage.

Referring to FIG. 12 herein, there is illustrated schematically a view from the rear of an embodiment of a column protector device fitted to a column. The inside of the column is viewable from behind, enabling visual inspection for damage of the inside of the column to be carried out, without removing the protector device form the column.

Secondly, for a more detailed inspection, the device can be removed within around 10 seconds by a person without the need for special tools, and can be refitted an about the same amount of time, again without the need for special tools.

Thirdly, in a modification of the device, a polycarbonate member in the form of an outer cover which fits over the outside of the outer shell, or in the form of an elongate strip which slides down between the front member of the rack upright and the inner liner can be provided. The polycarbonate strip serves the purpose of detecting impacts which exceed the design impact for which the column protector can safely absorb energy without the need to replace a column, or the polycarbonate member can be selected to detect impacts of an energy which will not significantly damage the column, but may require replacement of the column protector device after having absorbed such an impact. The polycarbonate member can be inspected for cracks or other damage which indicates that column replacement or column protector replacement is necessary, and such inspection can be achieved either by direct visual inspection of the polycarbonate outer cover, without the need to remove the column protector from its column, or where provided as a strip, by sliding the polycarbonate strip from between the inner liner and the column for visual inspection, again, without the need to remove the column protector from the column.

Advantages of the Embodiments

The embodiments of the impact protector are designed to absorb and dissipate the shock of a blow. The potentially destructive kinetic energy of motion is spread over as large an area as possible and as long a distance as possible thus diluting and deflecting concentrated forces that would lead to structural failure.

The ergonomic shape of the whole device allows it to be applicable to various types of different racking upright profiles for a universal accommodation of the embodiments. Whilst the end user may change his or her make of racking, the expense of also changing the upright protector will be avoided with using the current embodiments.

Further, the design of the current embodiments proactively accommodates occupational ergonomic considerations with regards to manual handling. It is lightweight, easy to install, has no sharp profiles and does not necessarily require any additional fastenings or anchor balls in order to be installed.

The column protector ensures the stability of pallet racking in a given direction that it is directly proportional to the horizontal distance of the center of gravity from that edge of the base toward the given direction of movement.

The external shape of the column protector device aims to ensure that the coefficient of friction is independent of the area of contact between the impacting load and the pallet racking thus reducing the likelihood of impact damage.

For each action there is always an equal and contrary reaction, while the majority of the kinetic energy of motion is dispatched throughout the device, a portion of the kinetic energy is transmitted back to the body which initiated the impact forces, thereby, reducing the destructive kinetic energy of motion transmitted to the pallet racking upright.

The low profile of the device is such that once attached to the rack upright, the device does not prohibitively encroach or reduce the required safe operating clearance dimensions of the racking system. During field research, it was identified that all other known rack upright protectors detrimentally reduced required clearances, interfered with the loading and alighting of loads and in many instances became an instrument which caused damage to the rack upright, pallets, palletized stock, MHE and the floor.

The materials used to manufacture the current embodiments have such innate properties so as to offer persistence of shape. Therefore, in the likely event that an impact does occur, the device has the ability to recover its original protective shape. All other known rack upright protectors do not have this ability.

Further, the current embodiments are manufactured with a material that is fully recyclable, non corrodible, is chemically resistant, does not harbor the capacity for bacterial growth, does not and in fact prevents the occurrence of impact ignition sparks in flammable atmosphere and does not accommodate moisture retention. In preventing the paint work of the rack upright from being degraded or scratched, the device prevents the likelihood of the rack upright and MHE from rust and corrosion.

Due to the flexible and closing properties of the tubular profile, the current embodiments grasp the rack upright thus negating the need to drill and fix mechanical or chemical floor fixing bolts or devices. Therefore, the important integrity of the floor foundation the rack is built upon is not compromised as well as avoiding costly installation and maintenance.

In addition to these potential installation difficulties, the device is designed to fail to safety in the unlikely event that it is snagged by MHE and will release itself from the rack upright before twisting deformation of the rack upright occurs.

The specific embodiments herein are not necessarily restricted for the use of pallet rack impact protection. The inventor realizes that it can be applied to any orientation of any column or structure that would benefit from impact protection.

It is acknowledged by the inventor that while the impact protector is in position, visual safety inspections of the rack upright will entail sliding the device up and then back down. While this task may be relatively easy, an additional feature to the embodiments may be developed once the impact performance of the device is established by an independent impact testing authority. The additional feature comprises a polycarbonate outer sheath to the device that shall only fail to crack propagation from forces that would exceed the devices impact tolerance. Alternatively, a similar polycarbonate insert could be inserted between the device and the front face of the rack that could then be easily removed and re-inserted for visual inspection purposes.

In various embodiments, the technical specifications for an outer shell and an inner liner may be selected from the ranges as follows.

Parameters which are particularly important include elastic modulus; Poissons ratio and yield strength.

Outer Shell

| | |
|---|---|
| Elastic Modulus: | Modulus of Elasticity (Young modulus), 400-1000 N/mm$^2$. |
| Poisson's Ratio: | Poisson's Ratio = 0.35 for short-term loading. |
| Temperature: | T - ° C. |
| Deformation modulus | Es - kN/m2 |
| Poisson ratio | n |
| Tensile & compressive strength | |
| $f_t$ & $f_C$ - kN/m$^2$ | |

Yield Strength

| Property | Test method | SI units | English units |
|---|---|---|---|
| Tensile strength @ ultimate | D638 | 35.1 MPa | 5,100 psi |
| Tensile strength @ ultimate | D638 | 24.8 MPa | 3,600 psi |

Generic Properties

| Property | Test method | SI units | English units |
|---|---|---|---|
| Density, natural | D1505 | 0.949 gm/cc | |
| Density, black | D1505 | 0.960 gm/cc | |
| Melt index (109° C./21.6 kg) | D1238 | 0.08 gm/10 min. | |
| Flow rate (109° C./21.6 kg) | D1238 | 7.5 gm/10 min | |
| Ultimate Elongation | D638 | >800% | >800% |
| Flexural Modulus | D790 | 1,034 MPa | 150.000 psi |
| 2% secant environmental stress crack resistance F0, condition C | D1639 | | |
| Pent | F1473 | >3,000 hrs. | >3000 hrs. |
| Brittleness temperature | D746 | <−117° C. | <180° F. |
| Hardness, Shore D | D 2240 | 64 | 64 |
| Izod impact strength (notched) | D256 | 0.42 KJ/m | 8 ft-lbf/in |
| Vicat softening temperature | D1525 | 124° C. | 255° F. |
| Volume resistivity | D991 | >1015 ohm-cm | |
| Thermal expansion coefficient | D696 | $2 \times 10^{-4}$ cm/cm/° C | $1.0 \times 10^{-4}$ in/in/° F. |

Inner Liner

In one embodiment, the inner liner component comprises of a closed cell, crossed-linked polyethylene foam, physically blown using nitrogen. Characteristics which have been found to be particularly suitable are as follow.

| | |
|---|---|
| Poissons Ratio: | 0.4 |
| Flexural Modulus: | 0.7 MPa |
| Tensile Strength: | 250 kPa |
| Nominal Density: | 29 kg/m$^3$ |
| Tear Strength: | 505 N/m |
| Elongation at break: | 95% |
| Shore hardness 00 scale: | 43 |

Compression Stress Strain Characteristics:

| | |
|---|---|
| 25% compression | 35 kPa |
| 40% compression | 65 kPa |
| 50% compression | 100 kPa |
| 60% compression | 150 kPa |

Compression Set:

| | |
|---|---|
| 72 hrs 50% compression 23° C., ½ hr recovery | 32% |
| 48 hrs 20% compression 23° C., ½ hr recovery | 8% |

Physical Properties:
i) Density Test Method: ISO 845
   BS4443 Part 1, Method 2
   DIN 53420 1978
Densities are measured with process skins unless otherwise stated.
ii) Cell Size Test Method: Internal, using a low power microscope with measuring system. Mean cell sizes are given in Table 1, together with maximum and minimum values of mean cell size (variation between sheets).
iii) Color: A color which is visually uniform within the foam structure of a sheet, has been found particularly suitable. However, minor variation may be found between sheets, or occasionally in small regions of a center split, due for instance to differences in cell size.
iv) Formability Test Method: Internal, using a test mould having areas of different depth/width moulding ratios. Details of the test mould can be provided on request. Products with nominal densities of 29 kg/m3 or less and conductive or static dissipative grades are thermoformable to a depth/width ratio 1/1.5 without losing structural integrity, e.g. by surface tearing. All other grades are thermoformable to a depth/width ratio of 1/1.

It will be appreciated by the skilled person that the above parameters and characteristics are by way of example only, and that for each parameter stated, variation of that parameter around the stated value may give acceptable performance. In particular, by stating the above parameters, the applicant discloses that each of those parameters varied individually, and or two or more parameters varied together in any combination by plus or minus 0% to 5% may also give acceptable and workable performance, and these ranges of variation are explicitly disclosed herein.

The invention claimed is:
1. A racking system comprising:
  an upright column having a channel-shaped cross section and including a front member, first and second side members extending from said front member, first and second connecting members extending from said first and second side members, respectively, third and fourth side members extending from said first and second connecting members, respectively, and first and second lip members extending from said third and fourth side members, wherein said front member and said first and second side members cooperate to form a substantially rectangular front portion, and wherein said first and second lip members extend outwardly from said third and fourth side members, respectively, and generally away from each other;
  a substantially cylindrical rigid outer shell including a substantially "C" shaped cross section having first and second ends defining a slotted opening, said first and second ends being disposed between said rectangular front portion of said upright column and said first and second lip members such that said first and second ends are spaced apart from said rectangular front portion and said first and second lip members when the column protector device is in a non-impacted state; and
  a resiliently compressible inner liner shaped to fit within said outer shell between said outer shell and said rectangular front portion of said upright column and including a "U" shaped channel configured to receive said rectangular front portion of said upright column, said resiliently compressible inner liner directly contacting said rectangular front portion and said outer shell in the non-impacted state such that said inner liner maintains said first and second ends of said outer shell spaced apart from said first and second lip members in the non-impacted state.
2. The racking system as claimed in claim 1, wherein the outer shell partially surrounds the first and second side members so that exposed upright edges of the outer shell lay adjacent to the sides of the column at a position where the column is relatively narrower.

3. The racking system as claimed in claim 1, wherein said outer shell comprises a tubular substantially part cylindrical member having a pair of substantially parallel opposing edges forming either side of the slotted opening; and said part cylindrical member extends over an angle in the range 260° to 280°, about a longitudinal center line of said outer shell.

4. The racking system as claimed in claim 1, wherein said outer shell has a height in the range 30 cm to 120 cm.

5. The racking system as claimed in claim 1, wherein said outer shell has an external diameter in the range 10 cm to 14 cm.

6. The racking system as claimed in claim 1, wherein said outer shell has a wall thickness in the range 7 mm to 9 mm.

7. The racking system as claimed in claim 1, wherein said outer shell comprises a pair of opposing longitudinal edges, and has a distance between said opposing longitudinal edges in the range 5 cm to 11 cm.

8. The racking system as claimed in claim 1, wherein said outer shell comprises a chamfered edge positioned at an end of said shell, between an upper face of said outer shell and an inner surface of said shell, to facilitate sliding of the inner liner with respect to the outer shell.

9. The racking system as claimed in claim 1, wherein said outer shell comprises at least one material selected from the set: a resilient elastomeric polymer based material; Polyethylene; high density Polyethylene; Polypropylene; Polycarbonate; Polyvinylchloride; Polystyrene; Plastic; and a mixture of plastics.

10. The racking system as claimed in claim 1, wherein said inner liner comprises a material selected from the set: an elastomeric material which is relatively less dense than a material of said outer shell; Polyethylene; Polypropylene; Polycarbonate; Polyvinylchloride; Polystyrene; natural rubber foam; synthetic rubber foam; a compressive composite material; and a closed cell SBR foam material.

11. The racking system as claimed in claim 1, wherein said inner liner has a height in the range 30 cm to 120 cm.

12. The racking system as claimed in claim 1, wherein said inner liner has an external diameter in the range 10 cm to 14 cm.

13. The racking system as claimed in claim 1, wherein said "U" shaped channel has a width in the range 7 cm to 12 cm.

14. The racking system as claimed in claim 1, wherein said "U" shaped channel has a depth in the range 2 cm to 4 cm.

15. The racking system as claimed in claim 1, wherein said inner liner is configured such that, after receiving an impact, the inner liner promotes the repositioning of the outer shell to a position similar to a position of the outer shell the impact occurred.

16. The racking system as claimed in claim 1, in which said outer shell partially surrounds the front member, and partially surrounds said first and second side members thereby protecting the front member and parts of the first and second side members from direct impact, said outer shell also partially surrounding said inner liner, which resides, in use between a substantially part cylindrical inner surface of the outer shell, and an outer face of the front member, an outer face of the first side member and an outer face of the second side member.

17. The racking system as claimed in claim 1, in which said inner liner and said outer shell are slideable with respect to each other in a direction along a main central axis of said outer shell.

18. The racking system as claimed in claim 1, in which said inner liner is bonded to an inner surface of the outer shell, such that the inner liner is fixed relative to the outer shell and cannot slide relative to the outer shell.

\* \* \* \* \*

UNITED STATES PATENT AND TRADEMARK OFFICE
CERTIFICATE OF CORRECTION

PATENT NO.         : 8,267,262 B2                                        Page 1 of 1
APPLICATION NO.    : 10/587779
DATED              : September 18, 2012
INVENTOR(S)        : Gordon Thelwell It is certified that error appears in the above-identified patent and that said Letters Patent is hereby corrected as shown below:

On the title page, item (56), References Cited, in the reference listed under Other Publications the word "Colum" should read -- Column --

In column 18, line 15, claim 15, the word -- before -- should be inserted between the words "shell" and "the"

Signed and Sealed this
Eighteenth Day of December, 2012

David J. Kappos
*Director of the United States Patent and Trademark Office*